United States Patent
Chung et al.

(10) Patent No.: US 8,620,245 B2
(45) Date of Patent: Dec. 31, 2013

(54) MOBILE DEVICE HAVING AT LEAST TWO ANTENNAS AND OPERATION CONTROL METHOD THEREOF

(75) Inventors: Chang Gwon Chung, Gyeonggi-do (KR); Hyun Kim, Seoul (KR); Myeong Hwa Kim, Seoul (KR); Geun Woo Kim, Gyeonggi-do (KR); Kyung Hwan Jo, Gyeonggi-do (KR); Doo Na Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1 day.

(21) Appl. No.: 12/773,060

(22) Filed: May 4, 2010

(65) Prior Publication Data

US 2010/0285759 A1  Nov. 11, 2010

(30) Foreign Application Priority Data

May 6, 2009  (KR) .................. 10-2009-0039320

(51) Int. Cl.
*H04B 17/02*  (2006.01)
(52) U.S. Cl.
USPC ........... 455/133; 455/101; 455/132; 455/143; 455/144; 455/272; 455/277.1; 455/550.1; 455/552.1; 455/553.1; 375/267; 375/299; 375/347; 375/349

(58) Field of Classification Search
USPC ................ 455/101, 132, 133, 143, 144, 272, 455/277.1, 550.1, 552.1, 553.1, 566, 575.3, 455/575.5; 375/267, 299, 347, 349; 343/702
See application file for complete search history.

(56) References Cited

U.S. PATENT DOCUMENTS

| | | | |
|---|---|---|---|
| 8,159,399 B2 * | 4/2012 | Dorsey et al. | 343/702 |
| 2002/0094789 A1 * | 7/2002 | Harano | 455/90 |
| 2008/0051134 A1 * | 2/2008 | Brobston et al. | 455/553.1 |
| 2009/0143106 A1 * | 6/2009 | Meitzler et al. | 455/566 |

\* cited by examiner

*Primary Examiner* — Junpeng Chen
(74) *Attorney, Agent, or Firm* — Cha & Reiter, LLC.

(57) ABSTRACT

A mobile device having at least two antennas can circumvent transmission problems caused by a user's grasp of the device. A sensor unit is disposed at a specific location of a device body and creates a sensor signal by detecting the contact or proximity of a particular object such a user's hand. When receiving the sensor signal, a control unit selects one of the antennas depending on the sensor signal and establishes a communication path based on the selected antenna. The selected antenna involved in the communication path is typically relatively free from degradation in transmission caused by a user's grasp of the mobile device. The radiation property of the mobile device, which may be degraded due to a user's grasp, can exhibit relatively little or no degradation as compared to the typical degradation in performance when the mobile device is being grasped.

18 Claims, 5 Drawing Sheets

MOBILE DEVICE HAVING AT LEAST TWO ANTENNAS AND OPERATION CONTROL METHOD THEREOF

CLAIM OF PRIORITY

This application claims the benefit of priority under 35 U.S.C. §119(a) from Korean Patent application number 10-2009-0039320 filed May 6, 2009, the contents of which are hereby incorporated by reference in its entirety.

BACKGROUND OF THE INVENTION

1. Field of the Invention

The present invention relates in general to a mobile device. More particularly, the present invention relates to mobile devices having at least two antennas and a method for controlling the operation of the mobile device in order to improve the radiation property thereof.

2. Description of the Related Art

With the dramatic advancements in modern-day scientific techniques, a great variety of mobile devices have been developed and introduced in the art that include ever-increasing amounts of functions and other improvements. Moreover, rapid advances in mobile communication technologies are permitting the enhancement of mobile devices with many useful applications that meet customer's demands. Accordingly, users of mobile devices today come to use information in various forms of voice, text, graphic, etc. and to enjoy music, broadcasts, games, etc. in addition to the traditional voice communication and portability provided therewith.

In addition, according to market demands for enhancing mobility or portability of mobile devices, there is growing tendency to make such devices smaller, thinner, lighter, and more multifunctional. Also, mobile devices have various form factors such as a bar-type, a flip-type, a folder-type, a slide-type, a swing-type, a swivel-type, etc.

Meanwhile, the traditional projecting or extractable antennas of mobile devices have been superseded by embedded antennas, namely, intennas. However, a size-limited mobile device is inherently restricted in space for embedding an antenna. For this reason, an antenna of a conventional mobile device is generally located in a relatively broader space available near a microphone. However, arrangement of the antenna at such locations (e.g. near the microphone) for an embedded antenna may almost correspond to a part where a user holds a mobile device or presses their face up against to listen and to talk. Unfortunately, this proximity to the antenna may cause a sudden degradation in the radiation property of an antenna. Normally a loss of radiation property due to a user's grasp with their hand is about 6 dB or more, so that it may seriously affect the quality of a call or a data communication.

SUMMARY OF THE INVENTION

Accordingly, the present invention can address the above-mentioned issues by providing a mobile device having at least two antennas and a method for controlling the operation of the mobile device. Such antennas of the mobile device are selectively used depending on whether and/or where a user grasps the mobile device. It is therefore possible to compensate/bypass a loss of radiation property due to a user's grasp and thus offer a reliable, stable and high-quality communication service that is not degraded by the size a user's hands or how the mobile device is held.

According to one exemplary aspect of the present invention, provided is a mobile device comprising: a radio frequency unit having at least two antennas; a sensor unit disposed at a specific location of a device body to sense whether the mobile device is in contact or proximity of a particular object external to the mobile device; and a control unit configured to select one of the antennas depending on a sensor signal received from the sensor unit and to establish a communication path based on the selected antenna.

According to another exemplary aspect of the present invention, provided is a method for controlling an operation of a mobile device which includes a radio frequency unit having at least two antennas, the method comprising: receiving a sensor signal from a sensor unit disposed at a specific location of a device body to sense whether the mobile device is in contact or proximity of a particular object external to the mobile device; selecting one of the antennas depending on the received sensor signal; and establishing a communication path based on the selected antenna.

Other exemplary aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of certain exemplary embodiments of the present invention will become more apparent from the following description taken in conjunction with the accompanying drawings, in which.

DETAILED DESCRIPTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed exemplary embodiments are provided so that this disclosure will be thorough and complete, and will fully convey the scope of the invention to those skilled in the art. The principles and features of this invention may be employed in varied and numerous exemplary embodiments without departing from the scope of the invention.

Furthermore, well-known or widely used techniques, elements, structures, and processes may not be described or illustrated in detail to avoid obscuring appreciation of the present invention by a person of ordinary skill in the art. Although the drawings represent exemplary embodiments of the invention, the drawings are not necessarily to scale and certain features may be exaggerated or omitted in order to better illustrate and explain the present invention.

Figure 1:
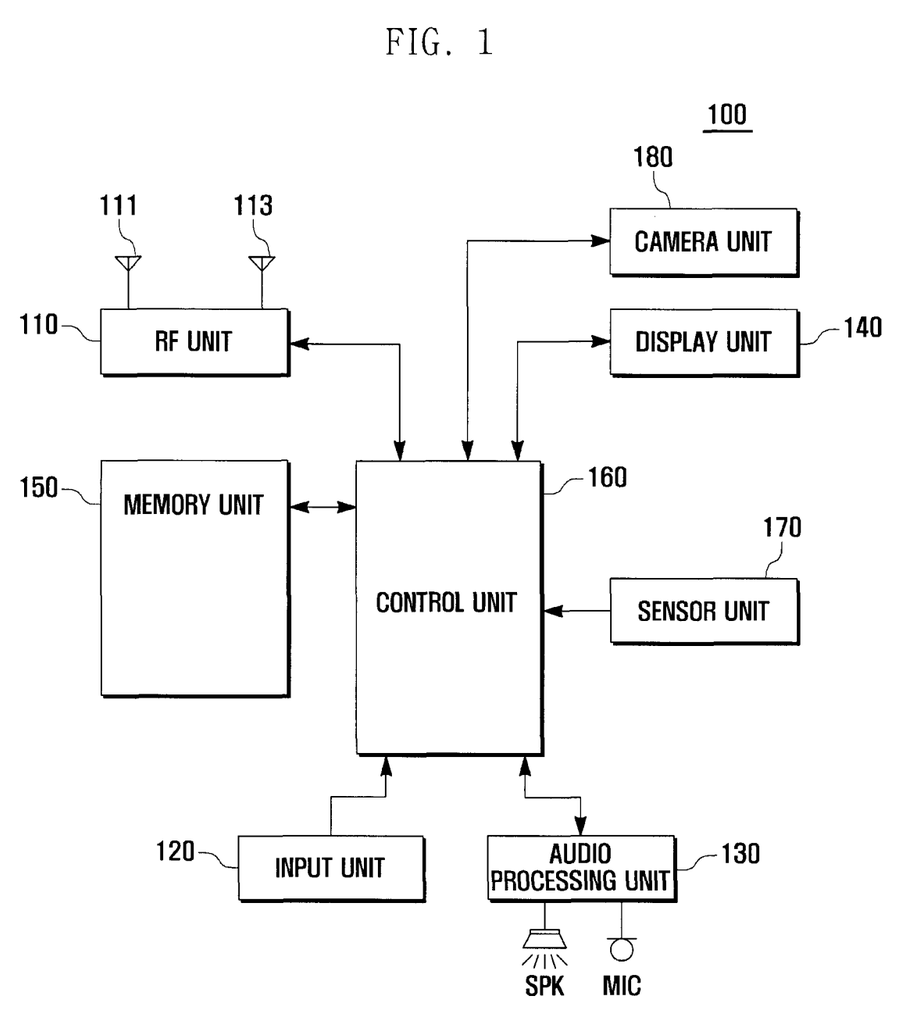
FIG. 1 is a block diagram that illustrates the configuration of a mobile device in accordance with an exemplary embodiment of the present invention.

FIG. 1 is a block diagram which illustrates the configuration of a mobile device in accordance with an exemplary embodiment of the present invention.

Referring now to FIG. 1, the mobile device 100 preferably includes a radio frequency (RF) unit 110, an input unit 120, an audio processing unit 130, a display unit 140, a memory unit 150, a sensor unit 170, a camera unit 180, and a control unit 160.

The mobile device 100 establishes a communication path based on a selected one of several antennas in the RF unit 110, depending on a sensor signal generated by the sensor unit 170. Then the mobile device 100 controls the transmission and reception of signals through such a communication path. Particularly, the sensor unit 170 is disposed at a specific location of a device body in consideration of a user's grasp with the hand. That is, the sensor unit 170 is disposed near an estimated contact position of a user's grasp, for example, at any location in a lower part of the device body. Therefore, the sensor unit 170 can detect a user's grasp with the hand and create a detection signal. Then the mobile device can selectively enable communication paths, depending on such a detection signal. A selected communication path is formed to pass through a specific antenna relatively distant from a user's grasping position compared to another one of the antennas, so the degradation in radiation property can be circumvented through the use of said specific antenna. Now, each element of the mobile device will be described in more detail.

With continued reference to FIG. 1, the RF unit 110 establishes necessary communication channels under the control of the control unit 160. That is, the RF unit 110 forms, for example, a voice call channel, a video call channel, a short message service (SMS) channel, a multimedia message service (MMS) channel, a data communication channel, etc. Additionally, the RF unit 110 converts audio/video data and control data into radio signals and transmits them to the air. Also, the RF unit 110 receives radio signals and converts them into audio/video data and control data. The RF unit 110 may include an RF transmitter which upwardly converts the frequency of signals to be transmitted and amplifies the signals, and an RF receiver which amplifies received signals with low-noise and downwardly converts the frequency of the received signals.

Particularly, the RF unit 110 according to an exemplary embodiment of this invention includes the first antenna 111 and the second antenna 113, which may have different available bands. For instance, the first antenna 111 may have a length or volume corresponding to a multi-band available for several types of a communication system such as Global System for Mobile (GSM), Data Communication System (DCS), Personal Communication System (PCS), and Wideband Code Division Multiple Access (WCDMA). On the contrary, the second antenna 113 may have a length or volume corresponding to a single band available for a particular communication system. That is, the length or volume of the second antenna 113 may be smaller than that of the first antenna 111. The first and second antennas 111 and 113 selectively form a communication path with the control unit 160, depending on a sensor signal the sensor unit 170 offers. A more detailed description will be given below.

The input unit 120 preferably includes a plurality of typical input keys and special function keys which are configured to receive user's instructions. The function keys may have navigation keys, side keys, shortcut keys, and any other special keys. The input unit 120 creates various key signals in association with user's instructions and delivers them to the control unit 160. Particularly, the input unit 120 may create a call key input signal for activating the RF unit 110.

The audio processing unit 130 has a speaker (SPK) for outputting audio signals and a microphone (MIC) for receiving audio signals. Particularly, the audio processing unit 130 according to an exemplary embodiment of the present invention may output any audio signal for notifying a user which particular antenna is selected for a communication path. That is, the audio processing unit 130 outputs the first audio signal when a communication path is based on the first antenna 111, and outputs the second audio signal when a communication path is based on the second antenna 113. In another exemplary embodiment, such a notification through audio signals may be omitted or replaced by the generation of different vibration patterns.

The display unit 140 represents a variety of information on a screen in association with the operation of the mobile device 100. For instance, the display unit 140 may offer many display pages, visual images, or graphical elements, including a booting page, an idle page, a menu page, a call page, etc. The display unit 140 may be formed of a liquid crystal display (LCD), an organic light emitting device (OLED), or any other type of think film technology and/or other equivalents. In case of using an LCD, the display unit 140 may have an LCD device, a memory, and a controller. On the other hand, the display unit 140 may be fabricated in a touch-based form such as a touch screen which has an input function in addition to a display function.

More particularly, the display unit 140 according to an exemplary embodiment of the present invention may output an input page associated with the input unit 120, a call page associated with the activation of the RF unit 110, and an image indicating a currently enabled communication path. That is, the display unit 140 can represent different graphical icons or images thereon, depending on whether or not a communication path is formed through the first antenna 111 or through the second antenna 113.

The memory unit 150 stores a variety of applications and data required for the operation of the mobile device 100, including a specific application for a voice call or a video call, a specific application for a camera control, and user data. Additionally, the memory unit 150 may act as, or include, a buffer to temporarily store signals transmitted or received through the RF unit 110 at a given sized capacity. The memory unit 150 may include a program region and a data region.

The program region stores an operating system (OS) for booting the mobile device 100, an application for the operation of the sensor unit 170, an application for the operation of the RF unit 110, an application for the control of the camera unit 180 and for the acquisition of audio, and an application for the execution of any other optional functions such as a sound output function, an image output function or a video play function. Among them, an application for the operation of the RF unit 110 may include, for example, a routine for controlling a selective use of antennas depending on a sensor signal delivered from the sensor unit 170.

The data region stores data created while the mobile device 100 is used. Specifically, the data region may store user data associated with various optional functions the mobile device 100 offers, including audio/video data, phonebook data, contents, etc.

The sensor unit 170 is disposed at a certain location on a body of the mobile device 100 and generates a sensor signal depending on a user's grasping state. Then the sensor unit 170 delivers such a sensor signal to the control unit 160. In an exemplary embodiment, the sensor is not signal strength but rather the presence of a hand that would degrade the transmission of the signal from the mobile device.

The sensor unit 170 may be formed of an infrared (IR) sensor. In this case, the sensor unit 170 has a light-emitting part and a light-receiving part. This sensor unit 170 emits a light beam at regular intervals and then receives reflected light. Based on such received light, the sensor unit 170 generates a sensor signal indicating a user's grasping state. Alternatively, the sensor unit 170 may be formed of a capacitive sensor. In this case, the sensor unit 170 is disposed in the form of a coil in or on a device body. This sensor unit 170 detects variation of capacitance caused by the contact or proximity of user's hand and then generates a sensor signal based on such variation.

In another case, the sensor unit 170 may be formed of any other sensor, such as a pressure sensor, which generates a sensor signal based on variation of physical or environmental factors caused by a user's grasp. Since the sensor unit 170 is used to sense the presence of the user's grasp and circumvent the degradation in radiation property due to a user's grasp by signaling back to the control unit so that the control unit users the other antenna, a capacitive sensor or a pressure sensor which can detect a user's actual contact on the device body may be desirable for the sensor unit 170. However, the sensor unit 170 is not limited to capacitive sensor or pressure sensor and may alternatively employ any other type of sensor that can be used to detect the present of the user holding the phone.

The camera unit 180 receives data signals by taking a picture and sends data signals to the control unit 160. Such data signals may be temporarily or semi-permanently stored depending on a user's selection. That is, when the mobile device 100 enables a function of taking photo/video, the camera unit 180 may store taken images in the memory unit 150 according to a user's selection. In addition, when the mobile device 100 performs a video call, the camera unit 180 may store outgoing images or incoming images in the memory unit 150 semi-permanently or temporarily in consideration of the capacity of the memory unit 150. The camera unit 180 may be activated at the start of a video call and may be inactivated at the end of a video call under the control of the control unit 160.

Meanwhile, the camera unit 180 may be disposed, for example, at an upper part of the device body. In addition, the camera unit 180 may be disposed on a front side of the device body together with the display unit 140 and/or on the back side of the device body.

The control unit 160 receives a sensor signal from the sensor unit 170. Based on a received sensor signal, the control unit 160 establishes a communication path with a selected one of the antennas (111, 113) in the RF unit 110 and then controls the transmission and reception of signals through the established path. If the RF unit 110 has the first antenna 111 disposed at the lower part of the device body and the second antenna 113 disposed at the upper part of the device body, and if a user's grasping position is near the first antenna 111, the control unit 160 may form a communication path with the second antenna 113 after receiving a sensor signal from the sensor unit 170. A related description will be given below with reference to FIG. 3.

Figure 2:
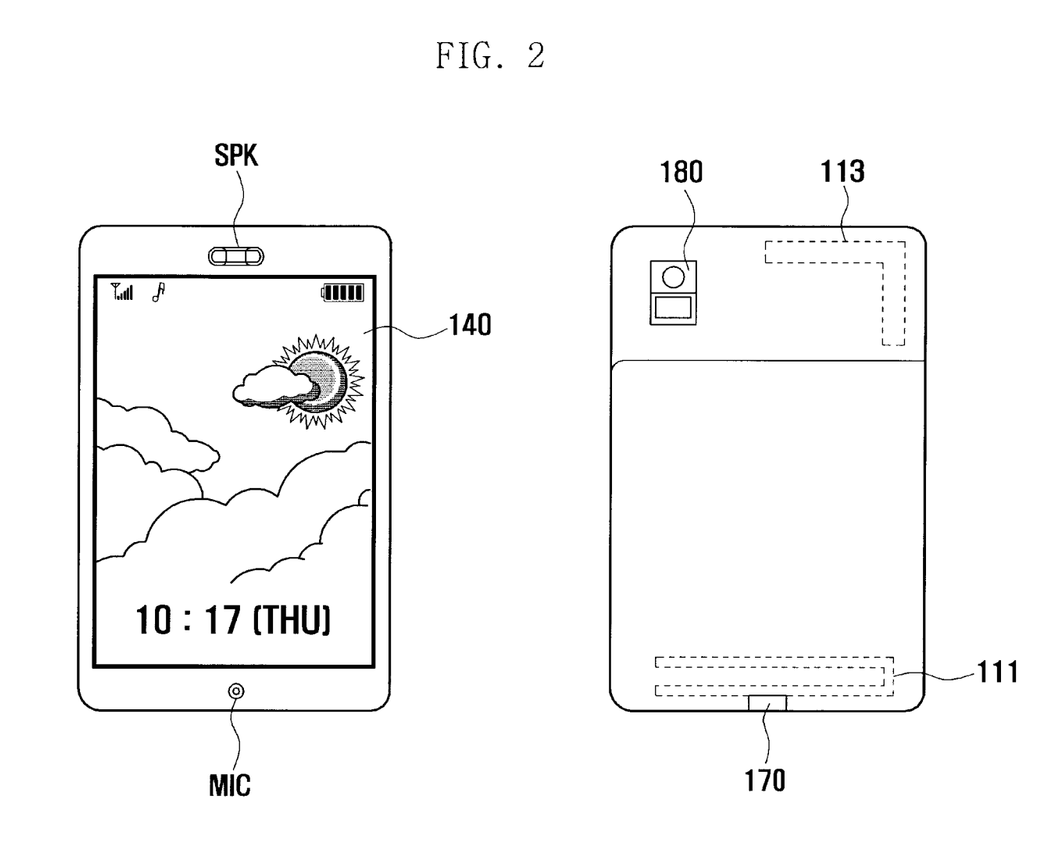
FIG. 2 is a view which illustrates the front side and back side of a mobile device in accordance with an exemplary embodiment of the present invention.

FIG. 2 is a view which illustrates the front side and back side of a mobile device in accordance with an exemplary embodiment of the present invention. Particularly, FIG. 2 shows the location of antennas embedded in the mobile device.

Referring now to FIG. 2, the display unit 140 is disposed on the front side of a device body. Also, on the front side, the speaker (SPK) is disposed at an upper part of the device body, and the microphone (MIC) is disposed at a lower part of the device body. Normally when a user who uses the mobile device grasps the device body, the speaker (SPK) may be located near a user's ear and the microphone (MIC) may be located near a user's mouth. Therefore, a user's hand may be typically located near the lower part of the device body.

Meanwhile, on the back side of the device body, a battery (not shown) is disposed at a middle part, and the camera unit 180 is disposed at the upper part. Additionally, the sensor unit 170 is disposed at the lower part of the device body. Furthermore, in the device body, the first antenna 111 is disposed near the sensor unit 170 at the lower part, and the second antenna 113 is disposed near the camera unit 180 at the upper part. Here, the first antenna 111 may be a multi-band antenna for supporting a multi-communication system such as GSM, DCS, PCS and WCDMA. Therefore, in order to send and receive signals at both a low frequency band and a high frequency band, the first antenna 111 needs a length or volume oriented to a low frequency band. That is, the first antenna 111 requires a relatively greater length or volume. So the first antenna 111 is normally disposed in a relatively broader space near a microphone (MIC).

In addition, since the upper part of the device body has normally the camera unit 180, the speaker (SPK), and other associated components therein, the upper part may have a narrower space than the lower part. Additionally, the camera unit 180 and the speaker (SPK) may be formed of metal or the like which may unfavorably affect the radiation property of an antenna. Therefore, any antenna in the upper part of the device body should be disposed at a proper distance from such metallic elements. As a result, in comparison with the lower part, the upper part of the mobile device has a relatively narrow space for accepting an antenna. So the second antenna 113 disposed in the upper part should have a smaller length or volume than that of the first antenna 111. That is, in order to send and receive signals at a high frequency band, the second antenna 113 needs a relatively smaller length or volume. For instance, if the first antenna 111 supports a low frequency band or a multi-band available for GSM, DCS and PCS, then the second antenna 113 may support a relatively high frequency band available for WCDMA. In other words, the first antenna 111 may preferably comprise either a low frequency band antenna or a multi-band antenna supporting a low frequency band, whereas the second antenna 113 may be a high frequency band antenna. Accordingly, the second antenna 113 may be formed with a smaller length or volume than the first antenna 111.

In the meantime, the sensor unit 170 may be disposed at any portion of the lower part of the device body in consideration of a user's grasp position. That is, the sensor unit 170 may be disposed regardless of the front side, the back side, the bottom side, or the lateral side of the device body. Besides, in order to create more reliable sensing signals, the sensor unit 170 may be composed of several sensors disposed separately.

Figure 3:
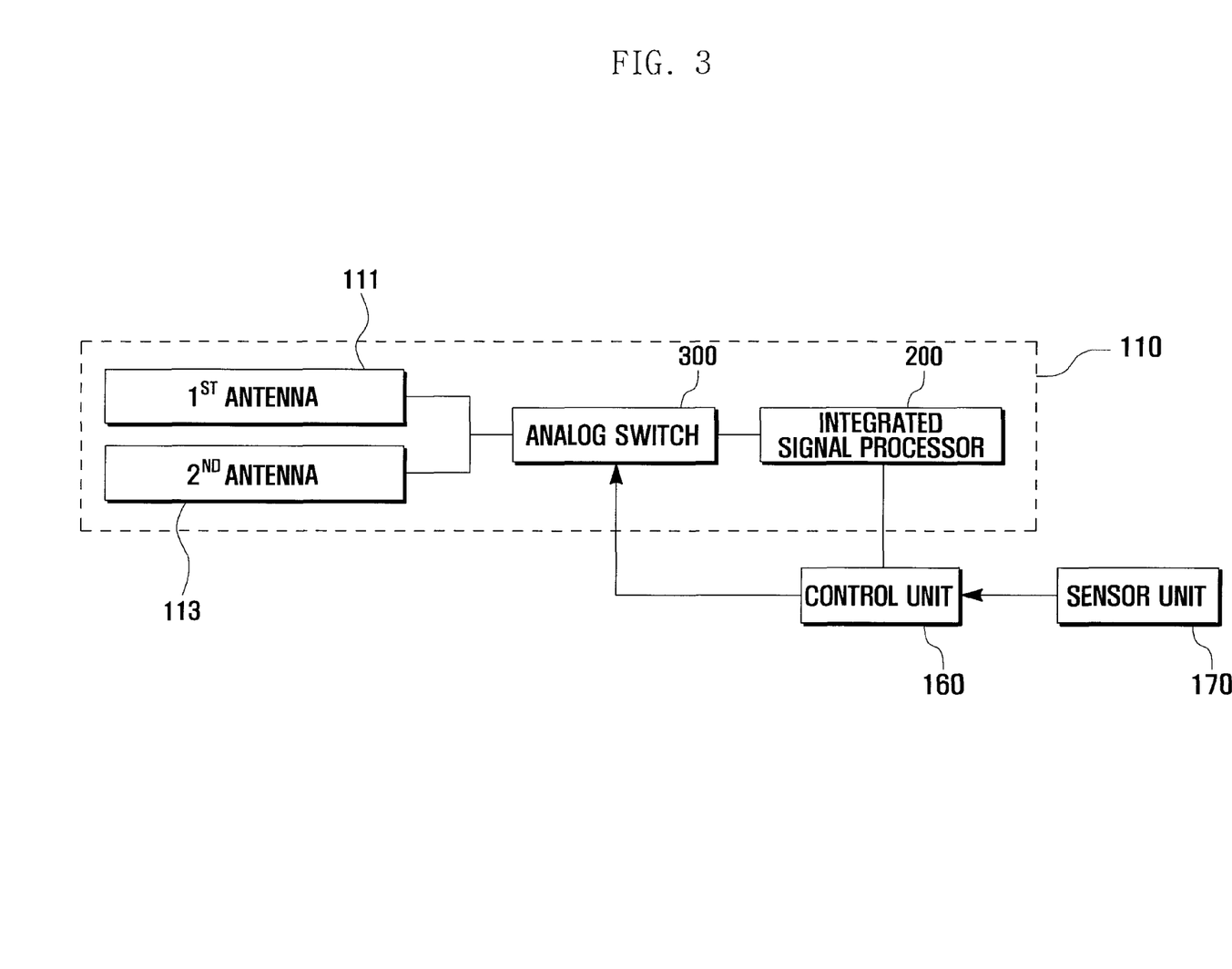
FIG. 3 is a block diagram which illustrates the configuration of a radio frequency unit in accordance with an exemplary embodiment of the present invention.

FIG. 3 is a block diagram which illustrates the configuration of a radio frequency unit in accordance with an exemplary embodiment of the present invention.

Referring now to FIG. 3, the RF unit 110 preferably includes the first antenna 111, the second antenna 113, an analog switch 300, and an integrated signal processor 200. The switch preferably comprises an analog switch 300 and the integrated signal processor 200 may operate under the control of the control unit 160.

The analog switch 300 selectively connects the first and second antennas 111 and 113 to the integrated signal processor 200. That is, depending on a control signal from the control unit 160, the analog switch 300 connects the first antenna 111 to the integrated signal processor 200 or alternatively connects the second antenna 113 to the integrated signal processor 200.

If necessary, an RF connector (not shown) may be provided between the analog switch 300 and the integrated signal processor 200. The RF connector may allow the separation between the antennas and the integrated signal processor 200 in order to examine the properties of the antennas. That is, a designer of the mobile device can perform a test for the specific properties of the antennas by using the RF connector. In such a test process, it is possible to regulate control signals inputted into the analog switch 300 from the control unit 160. So a test for the specific properties of several antennas becomes easier and faster to perform.

The integrated signal processor 200 supports the transmission and reception of signals through a specific communication path (i.e., an antenna) selected by the analog switch 300. The integrated signal processor 200 may include an up converter which upwardly converts the frequency of signals to be transmitted and amplifies the signals, and a down converter which amplifies received signals with low-noise and downwardly converts the frequency of the received signals. Specifically, when the mobile device activates a reception function, the down converter performs low-noise amplification and down-conversion for received signals and then delivers them to the control unit 160. Additionally, when the mobile device activates a transmission function, the up converter performs up-conversion and amplification for signals to be transmitted and then delivers them to a selected antenna via the analog switch 300.

Also, when the mobile device supports a multi-communication system, the integrated signal processor 200 may further have amplifiers available for additional respective communication systems, for example, a GSM amplifier and a WCDMA amplifier. Additionally, in this case, the integrated signal processor 200 may further have a switch-plexer which allows the distribution of signals according to types of a communication system. On the other hand, when the mobile device supports WCDMA only, the integrated signal processor 200 may further have a WCDMA duplexer. In case of supporting a multi-communication system, the integrated signal processor 200 may be formed of a single processor or alternatively may be composed of several communication chips, each of which is separately mounted and independently supports a specific type of a communication system. In the latter case, the control unit 160 may activate only a single chip supporting to a particular communication system selected by a user or default.

Meanwhile, the control unit 160 demodulates and decodes received signals and modulates and encodes signals for transmission. At this time, the control unit 160 creates a control signal used to selectively form a path with one of the first and second antennas 111 and 113, depending on a sensor signal received from the sensor unit 170 and further depending on a type of a communication system selected by a user or default. For instance, in the case where the first antenna 111 is designed to support a multi-band available for a multi-communication system, and the second antenna 113 is designed to support a high frequency band, then in this case, if a currently used communication system is based on a high frequency band, the control unit 160 establishes a communication path with the second antenna 113 after receiving a sensor signal generated by a user's grasp. On the contrary, if a currently used communication system is based on a low frequency band, the control unit 160 establishes a communication path with the first antenna 111 in spite of receiving a sensor signal generated by a user's grasp.

Sometimes a user may not grasp the device body when using a communication function of the mobile device. For instance, a user may place the mobile device in a holder while wearing an earphone or a wireless headset, such as a hands-free configuration in his automobile. This situation may be free from an unfavorable influence of a user's grasp. Here, the sensor unit 170 does not create a sensor signal, so the mobile device forms a communication path with the first antenna 111. As discussed above, the second antenna 113 may have poorer mounting environments than the first antenna 111. If the first antenna 111 supports a multi-band including a high frequency band of the second antenna 113, the first antenna 111 may have a better performance than the second antenna 113. So, if there is no influence of a user's grasp, a communication function based on the first antenna 111 may be favorable for the quality of service.

TABLE 1

|  | $1^{st}$ Antenna | $2^{nd}$ Antenna |
|---|---|---|
| Mute Rate | 67% | 27% |
| Transmission Success Rate | 44% | 100% |
| Reception Success Rate | 54% | 100% |

Table 1 shows a mute rate, a transmission success rate and a reception success rate obtained when a user grasps the lower part of the device body in which the first antenna 111 is disposed at the lower part of the device body and the second antenna 113 is disposed at the upper part of the device body. As understood from Table 1, in case where the first antenna 111 is affected by a user's grasp, a communication path with the first antenna 111 is poorer in all of a mute rate, a transmission success rate and a reception success rate than a communication path with the second antenna 113.

TABLE 2

|  |  | Free Space $1^{st}$ Antenna | | Hand Phantom $1^{st}$ Antenna | |
|---|---|---|---|---|---|
|  |  | TIS | TRP | TIS | TRP |
| WCDMA Band | $1^{st}$ Measure | −105 dBm | 20 dBm | −98 dBm | 14 dBm |
|  | $2^{nd}$ Measure | −104 dBm | 20 dBm | −97 dBm | 13 dBm |
|  | $3^{rd}$ Measure | −105 dBm | 19 dBm | −96 dBm | 14 dBm |

Table 2 shows the result of measuring signal properties, total isotropic sensitivity (TIS) and total radiated power (TRP), when the first antenna 111 disposed at the lower part of the device body supports a WCDMA band. A lower TIS and a higher TRP respectively indicate a better quality of a communication service. As understood from Table 2, in comparison with the state of a free space, TIS and TRP are relatively lower by 6 dB or more in the state of a hand phantom (i.e., the state of a user's grasp). That is, a user's grasp causes a loss of radiation property by 6 dB or more.

TABLE 3

|  |  | Free Space | | | | Hand Phantom | | | |
|---|---|---|---|---|---|---|---|---|---|
|  |  | $2^{nd}$ Antenna | | $1^{st}$ Antenna | | $2^{nd}$ Antenna | | $1^{st}$ Antenna | |
|  |  | TIS | TRP | TIS | TRP | TIS | TRP | TIS | TRP |
| WCDMA Band | $1^{st}$ | −105 | 20 | −105 | 20 | −102 | 18 | −98 | 14 |
|  | $2^{nd}$ | −103 | 20 | −104 | 20 | −102 | 18 | −97 | 13 |
|  | 3rd | −104 | 19 | −105 | 19 | −103 | 18 | −96 | 14 |

Table 3 shows the result of measuring signal properties, TIS and TRP, based on WCDMA when the first and second antennas 111 and 113 are in the state of a free space and in the state of a hand phantom. A lower TIS and a higher TRP respectively indicate a better quality of a communication service. As understood from Table 3, in the state of a hand phantom, the second antenna 113 has better properties by about 5 dB than the first antenna 111. Although the properties of the second antenna 113 are slightly reduced in the state of a hand phantom by comparison with the state of a free space, the properties of the second antenna 113 are better than those of the first antenna 111 when in the state of a hand phantom.

As fully discussed heretofore, the mobile device according to an exemplary embodiment of this invention may offer enhanced communication quality by realizing a communication service based on an alternative antenna being free from a user's grasp.

Figure 4:
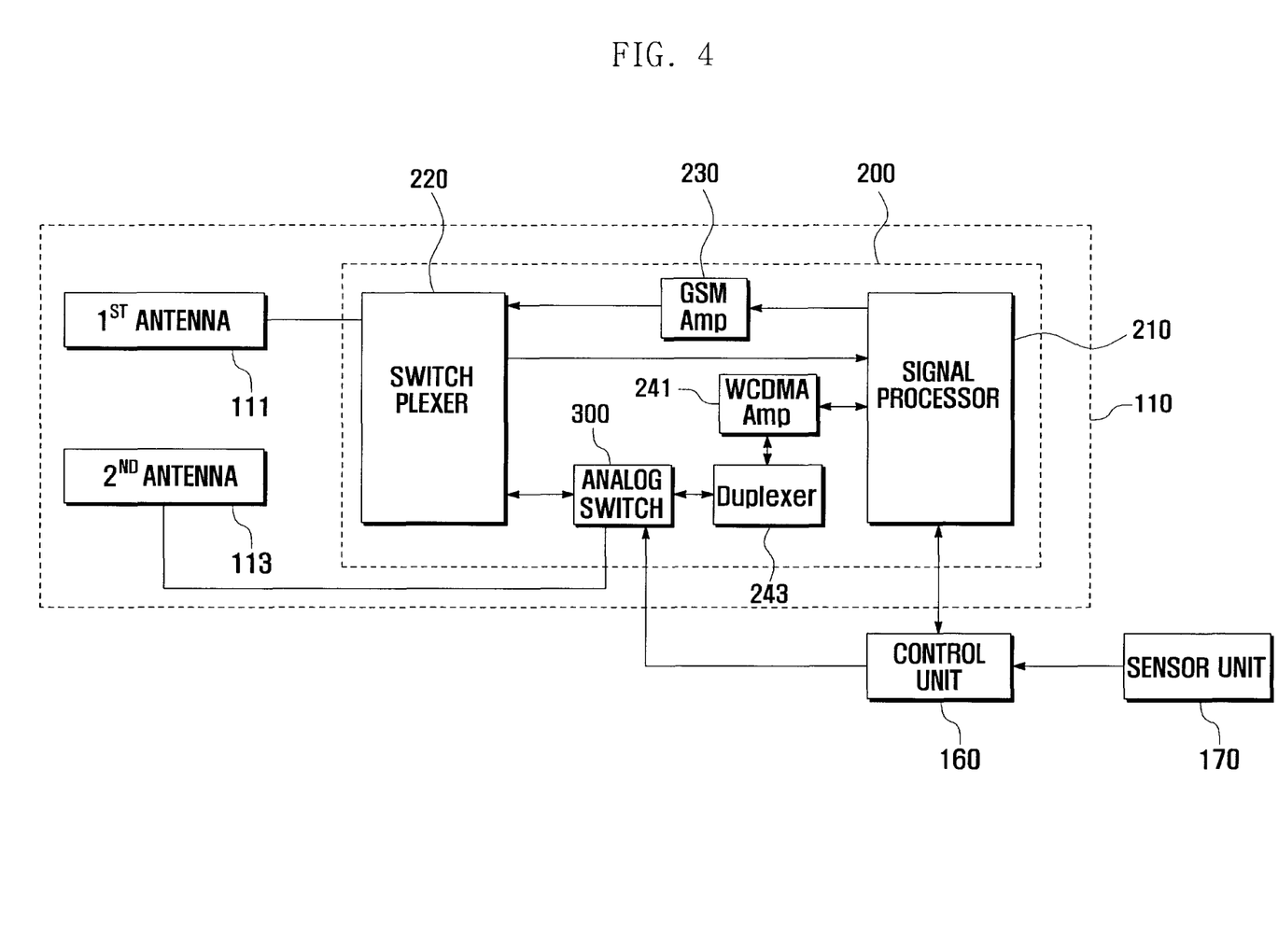
FIG. 4 is a block diagram which illustrates the configuration of a radio frequency unit in accordance with another exemplary embodiment of the present invention.

FIG. 4 is a block diagram which illustrates the configuration of a radio frequency unit in accordance with another exemplary embodiment of the present invention.

Referring now to FIG. 4, the RF unit 110 in this exemplary embodiment includes the first antenna 111, the second antenna 113, and an integrated signal processor 200 connected with the first antenna 111. The integrated signal processor 200 preferably has an analog switch 300 mounted therein. The second antenna 113 is connected with the analog switch 300.

The integrated signal processor 200 may have a switch-plexer 220 connected with the first antenna 111, a GSM AMP 230, a WCDMA AMP 241, a duplexer 243, the analog switch 300, and a signal processor 210.

The signal processor 210 may include an up converter for performing up-conversion and amplification for signals to be transmitted, and a down converter for performing low-noise amplification and down-conversion for received signals. The GSM AMP 230 amplifies GSM-based communication signals delivered from the signal processor 210 and sends them to the switch-plexer 220. The WCDMA AMP 241 is located between the duplexer 243 and the signal processor 210, and amplifies WCDMA-based signals. The duplexer 243 controls transmission timing and reception timing of WCDMA-based signals.

The analog switch 300 is disposed between the duplexer 243 and the switch-plexer 220. The analog switch 300 connects the switch-plexer 220 and the duplexer 243 when the first antenna 111 is enabled. On the contrary, the analog switch 300 connects the duplexer 243 and the second antenna 113 when the second antenna 113 is enabled. The switch-plexer 220 distributes signals depending on a current communication system when the first antenna 111 is enabled.

The control unit 160 turns on or off the analog switch 300 according to a sensor signal delivered from the sensor unit 170. That is, the control unit 160 selectively forms a WCDMA-based communication path with the first antenna 111 or with the second antenna 113. When the second antenna 113 is enabled, the integrated signal processor 200 may support the transmission and reception of WCDMA-based signals without passing through the switch-plexer 220. This may prevent signal attenuation due to the switch-plexer 220 and thus offer better communication quality.

As discussed above, the mobile device according to an embodiment of this invention may minimize unnecessary signal attenuation by involving the second antenna 113 affected by a user's grasp in a direct path for supporting a particular communication system.

Figure 5:
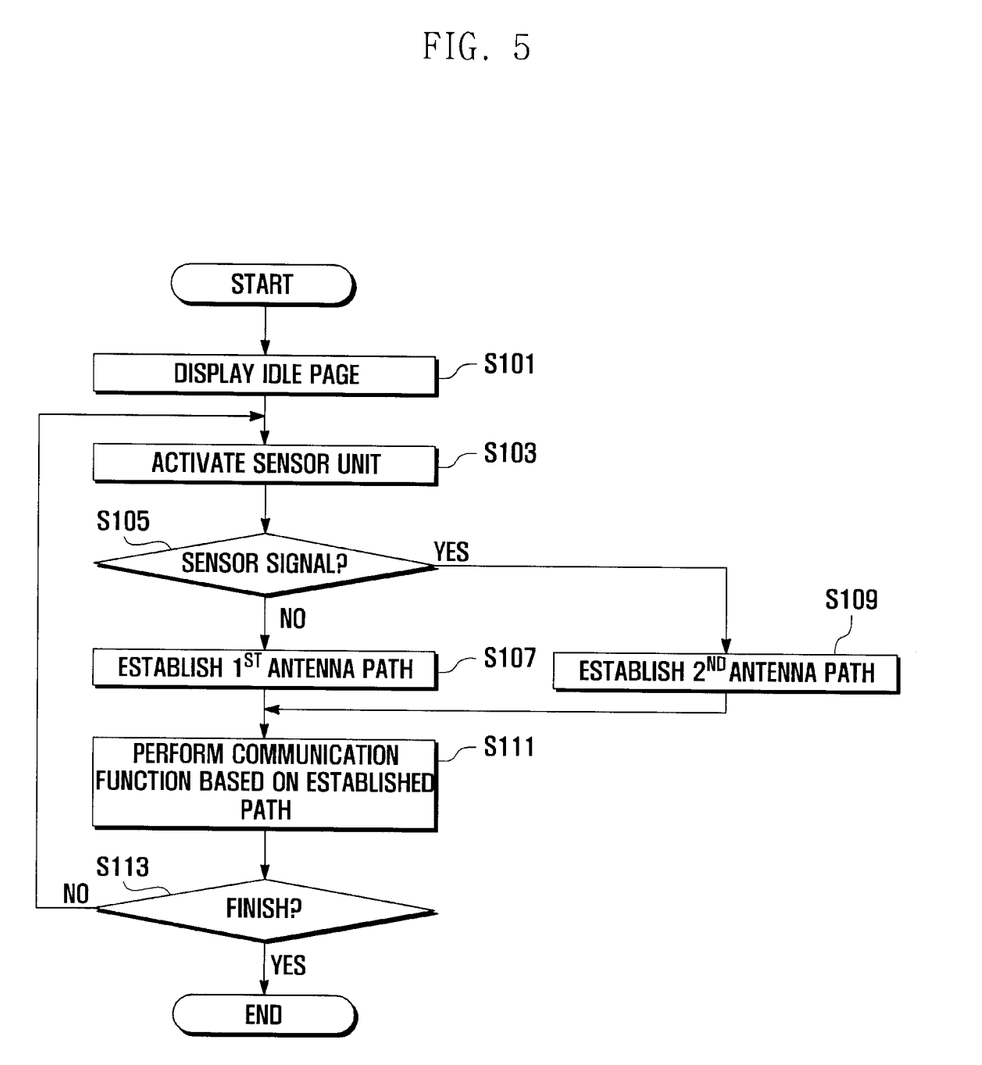
FIG. 5 is a flow diagram which illustrates a method for controlling the operation of a mobile device in accordance with an exemplary embodiment of the present invention.

FIG. 5 is a flow chart which illustrates a method for controlling the operation of a mobile device in accordance with an exemplary embodiment of the present invention.

Referring now to FIG. 5, at step (S101), when electric power is supplied, the mobile device initializes its elements and outputs a given idle page on the display unit. Additionally, such an idle page may be displayed when the mobile device enters into a sleep mode for power saving because of receiving no input signal for a given time or when a specific input signal is generated.

In the meantime, at step (S103), when receiving a request for a call from any other mobile device, the mobile device activates the sensor unit by supplying electric power. Then at step (S105) the mobile device determines whether or not a sensor signal is received from the sensor unit. As discussed above, when a user grasps the device body of the mobile device, the sensor unit detects a user's grasp and creates a sensor signal.

If there is no sensor signal in the step S105, then at step (S107) the mobile device establishes or maintains a first communication path using the first antenna. As discussed above, the first antenna may support a low frequency band or a multi-band including a low frequency band. In addition, the location where the first antenna is disposed may be sensitive to a user's grasp when a user grasps the mobile device.

Meanwhile, the mobile device may define any communication path as a default. If the first path connected with the first antenna is defined as default, the mobile device maintains the first path in the step S107. On the contrary, if another path connected with the second antenna is defined as a default, the mobile device controls the analog switch to form the first path instead of a default path in the step S107.

If a sensor signal is received in the step S105, then at step (S109) the mobile device establishes a second communication path using the second antenna. As discussed above, the second antenna may be disposed relatively closer to the speaker, for example, and thus is free from a user's grasp. Since the second antenna is disposed in a relatively narrow space within the mobile device, the second antenna may have a relatively smaller length or volume to support a high frequency band than the first antenna.

After the first or second communication path is established in the step S107 or S109, then at step (S111) the mobile device performs a prearranged communication function based on the established communication path.

Also, at step (S113) the mobile device determines whether or not to finish the use of the mobile device. In the case where the mobile device has determined that the process is not finished, the mobile device returns to the aforesaid step S103.

In the above-discussed exemplary embodiment, the first antenna supports a multi-band and the second antenna supports a specific frequency band. In another exemplary embodiment, the second antenna may support two or more communication systems with high frequency bands. In this case, the second antenna should be designed to have a length or volume suitable for supporting such systems in consideration of its embedded space. That is, the second antenna may preferably support at least one high frequency band.

On the other hand, the mobile device may employ a variety of sensors, such as an IR sensor or a capacitive sensor, for the sensor unit as discussed above. In some embodiments, a particular sensor such as a capacitive sensor may be preferably used to detect a user's grasping state with greater accuracy.

While the present invention has been particularly shown and described with reference to an exemplary embodiment thereof, a person of ordinary skill in the art should understand that various changes in form and details may be made therein without departing from the spirit and scope of the invention as defined by the appended claims.

What is claimed is:

1. A mobile device comprising:
a radio frequency unit having at least first and second antennas, the first antenna configured for use at a first plurality of frequency bands, the second antenna configured for use at one or more predetermined frequency bands including at least one common frequency band of the first plurality of frequency bands;
a sensor unit disposed at a specific location of a device body to sense whether the mobile device is in contact with or in proximity of a particular object external to the mobile device;
a control unit configured to select, for operation in the at least one common band, one of the first and second antennas depending upon a sensor signal received from the sensor unit and to establish a communication path based on the selected antenna so the established communication path passes through the selected antenna relatively distant from a user's grasping position compared to the other one of the first and second antennas, and the control unit configured to select the first antenna for operation in at least one particular frequency band of the first plurality of frequency bands that is not one of the predetermined frequency bands and to establish a communication path to the first antenna regardless of an output of the sensor unit;
a signal processor configured to perform up-conversion or down-conversion for radio signals;
first and second amplifiers configured to amplify radio signals according to a specific type of at least first and second communication systems, respectively, the second communication system supporting the common frequency band;
a switch-plexer connected between the first amplifier and the first antenna in a first path, and between the first antenna and the second amplifier in a second path, and configured to distribute the signals; and
an analog switch disposed between the switch-plexer and the second amplifier;
wherein the control unit is further configured to control the analog switch to establish the communication path based on the selected antenna and a selected one of the first and second amplifiers by bypassing the switch-plexer during operations in which the second antenna is selected.

2. A method for controlling an operation of a mobile device which includes a radio frequency unit having at least first and second antennas, said method comprising:
providing the first antenna configured for use at a first plurality of frequency bands, and the second antenna configured for use at the one or more predetermined frequency bands which includes at least one common frequency band of the first plurality of frequency bands;
receiving a sensor signal from a sensor unit disposed at a specific location of a device body to sense whether the mobile device is in contact with or in proximity of a particular object external to the mobile device;
selecting one of the antennas depending on the received sensor signal, during operation in the at least one common frequency band;
establishing a communication path based on the selected antenna, wherein the established communication path passes through the selected antenna relatively distant from a user's grasping position compared to the other one of the first and second antennas;
wherein the establishing of the communication path includes:
establishing a first communication path based on the first antenna when no sensor signal is received from the sensor unit, the first antenna supporting a communication system having a low frequency band and supporting a plurality of communication systems for both the low frequency band and a high frequency band which is the common frequency band; and
establishing a second communication path based on the second antenna when the sensor signal from the sensor unit is received, the second antenna supporting a communication system having at least the high frequency band; and
wherein the establishing of the communication path includes establishing the communication path through a switch-plexer and a first or second amplifier of a respective communication system when the first antenna is selected, and bypassing the switch-plexer via an analog switch when the second antenna is selected.

3. The method of claim 2, further comprising selecting, for at least one frequency band of the first plurality of frequency bands other than the one or more common frequency bands, the first antenna for operation regardless of whether a sensor signal from the sensor unit is received.

4. The method of claim 2, wherein the receiving of the sensor signal includes at least one of:
creating the sensor signal by detecting a variation of capacitance caused by the contact or proximity of the particular object with the mobile device; and
creating the sensor signal by detecting a variation of light caused by the contact or proximity of the particular object with the mobile device.

5. The method of claim 2, wherein the second antenna has a smaller length or volume than the first antenna.

6. The method of claim 2, wherein the first antenna is disposed adjacent a microphone and the second antenna is disposed adjacent a speaker.

7. The method of claim 2, wherein the switch-plexer and analog switch are part of a common integrated signal processor, the integrated signal processor further comprises a signal processor processing transmission and reception of signals, the analog switch being disposed between the signal processor and the antennas.

8. The method according to claim 2, wherein the first antenna is arranged closer to a microphone than the second antenna.

9. The method according to claim 2, wherein the second antenna is arranged closer to a speaker than the first antenna.

10. A mobile device comprising:
a radio frequency unit having at least first and second antennas, the first antenna configured for use at a first plurality of frequency bands, the second antenna configured for use at one or more predetermined frequency bands including at least one common frequency band of the first plurality of frequency bands;
a sensor unit disposed at a specific location of a device body to sense whether the mobile device is in contact with or in proximity of a particular object external to the mobile device;
a control unit configured to select, for operation in the at least one common band, one of the first and second antennas depending upon a sensor signal received from the sensor unit and to establish a communication path based on the selected antenna so the established communication path passes through the selected antenna relatively distant from a user's grasping position compared to the other one of the first and second antennas;

a signal processor configured to perform up-conversion or down-conversion for radio signals;

first and second amplifiers configured to amplify radio signals according to a specific type of at least first and second communication systems, respectively, the second communication system supporting the common frequency band;

a switch-plexer connected between the first amplifier and the first antenna in a first path, and between the first antenna and the second amplifier in a second path, and configured to distribute the signals; and an analog switch disposed between the switch-plexer and the second amplifier;

wherein the control unit is further configured to control the analog switch to establish the communication path based on the selected antenna and a selected one of the first and second amplifiers by bypassing the switch-plexer during operations in which the second antenna is selected.

11. The mobile device claim 10, wherein the sensor unit creates the sensor signal depending on the contact or proximity of the particular object external to the mobile device.

12. The mobile device claim 10, wherein the sensor unit includes a capacitive sensor creating the sensor signal according to a variation of capacitance caused by the contact of the particular object with the mobile device.

13. The mobile device claim 10, wherein the sensor unit includes a proximity sensor creating the sensor signal according to a variation of light caused by the contact of the particular object with the mobile device.

14. The mobile device claim 10, wherein:

the first antenna supports a communication system for a low frequency band and supports a plurality of communication systems for both the low frequency band and a high frequency band, the common frequency band being the high frequency band; and the second antenna supports a communication system for at least the high frequency band.

15. The mobile device claim 14, wherein the second antenna has a smaller length or volume than the first antenna.

16. The mobile device claim 14, wherein the first antenna is disposed adjacent a microphone of the mobile device and the second antenna is disposed adjacent a speaker.

17. The mobile device claim 14, wherein the first antenna is arranged closer to a microphone than the second antenna.

18. The mobile device claim 10, wherein the radio frequency unit further comprises an integrated signal processor comprising the switch-plexer, the analog switch, and a signal processor to process the transmission and reception of signals, the analog switch being disposed between the signal processor and the antennas.

* * * * *